Sept. 15, 1931.  P. DE LACY-MULHALL  1,822,901
QUANTITY CONTROL APPARATUS
Filed Oct. 10, 1928  2 Sheets-Sheet 1
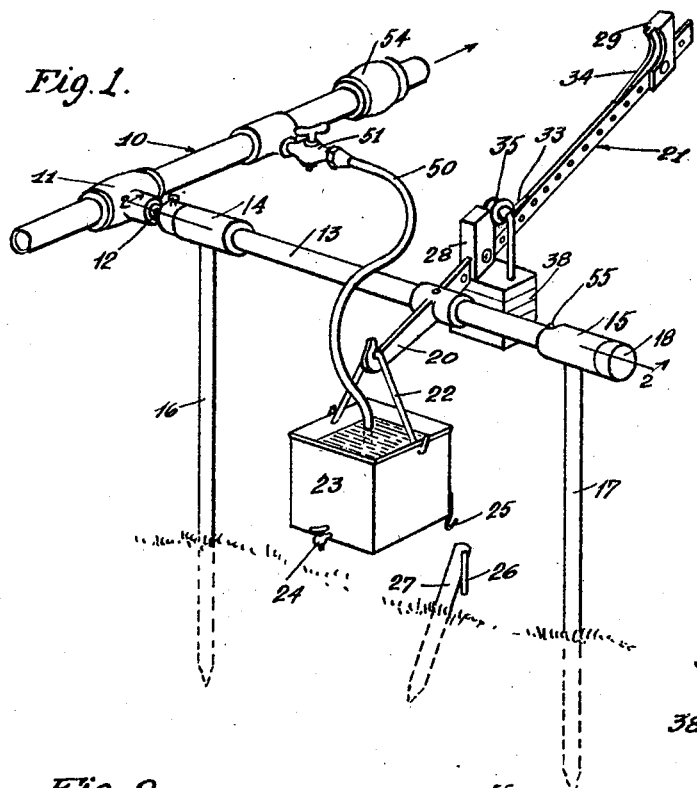
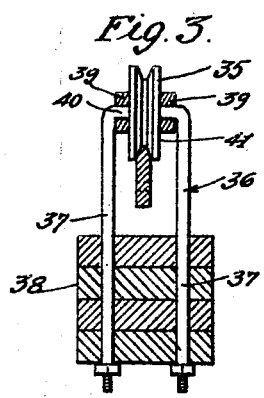
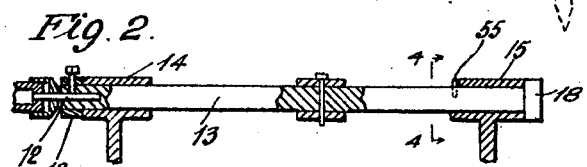
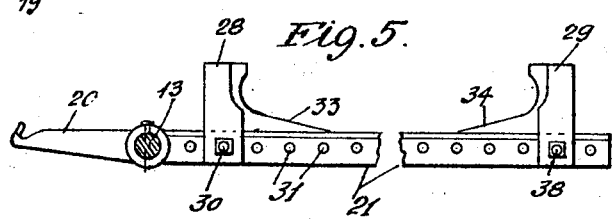
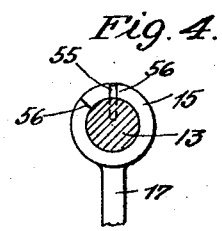
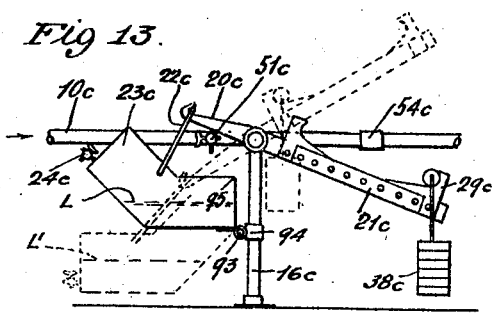
Inventor.
Patrick Delacy-Mulhall.
Attorney.

Sept. 15, 1931.   P. DE LACY-MULHALL   1,822,901
QUANTITY CONTROL APPARATUS
Filed Oct. 10, 1928    2 Sheets-Sheet 2
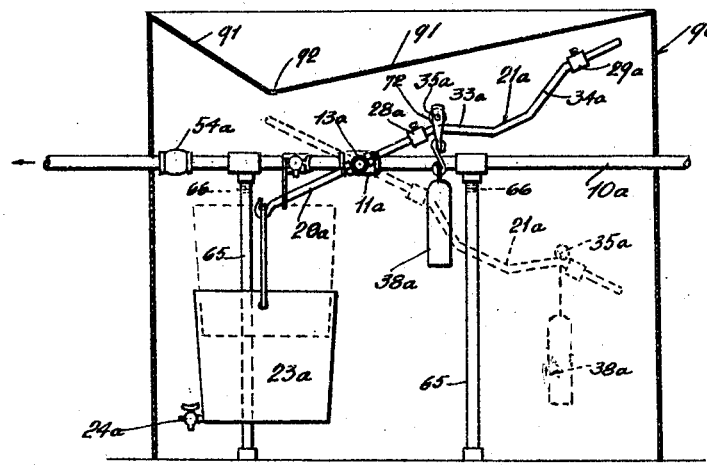
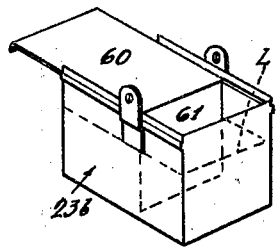
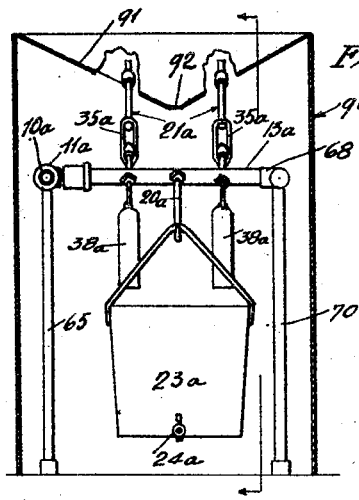
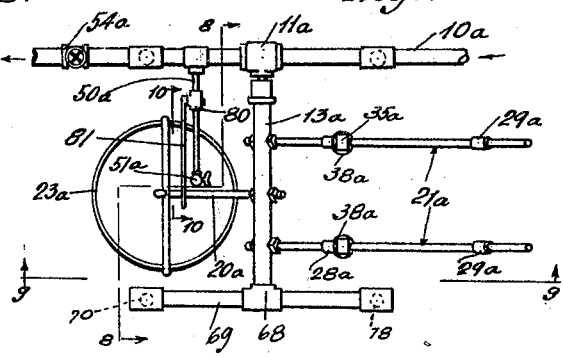
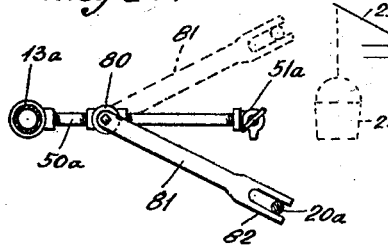
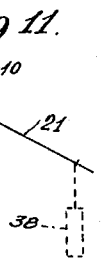
Inventor
Patrick Delacy-Mulhall.
Attorney.

Patented Sept. 15, 1931

1,822,901

UNITED STATES PATENT OFFICE

PATRICK DE LACY-MULHALL, OF LOS ANGELES, CALIFORNIA

QUANTITY CONTROL APPARATUS

Application filed October 10, 1928. Serial No. 311,548.

This invention is concerned with a quantity control apparatus, characterized in that it controls the quantity of flow through a conduit by permitting intermittent periods of flow, and further characterized in that these periods of flow may be regulated in occurrence and duration to suit varying requirements. Such a device has particular utility when applied to the control of irrigation operations, and will therefore be herein described and illustrated as embodied in a form particularly adapted to this use. It will be appreciated, however, that the invention is not limited to this application, but is capable of being adapted for use in a variety of other connections.

The various objects and features of the invention will be best understood from the following detailed description, reference for this purpose being had to the accompanying drawings, in which:

Fig. 1 is a perspective view of one embodiment of the invention;

Fig. 2 is a detailed section taken on line 2—2 of Fig. 1;

Fig. 3 is a detailed vertical section of the trolley and weight shown in Fig. 1;

Fig. 4 is a section taken on line 4—4 of Fig. 2;

Fig. 5 is a detailed section of the bucket and weight arms shown in Fig. 1;

Fig. 6 shows a modified form of bucket;

Fig. 7 is a plan view of a modified present embodiment of the invention;

Fig. 8 is a section taken on line 8—8 of Fig. 7;

Fig. 9 is a section taken on line 9—9 of Fig. 7;

Fig. 10 is a fragmentary view taken on line 10—10 of Fig. 7;

Fig. 11 is a diagrammatic view showing the control valve positioned for one extreme position of the device;

Fig. 12 is a diagrammatic view showing the control valve positioned for the other extreme position of the device; and Fig. 13 is an end elevation of a modified embodiment of the device.

Figs. 7, 8 and 9 show my invention in one form in which it is embodied at present, while in Fig. 1 is shown a simplified embodiment which I may employ, and in connection with which I shall now proceed to detail the invention.

Referring particularly to Fig. 1, I show at 10 a pipe line through which a fluid may pass, the direction of flow being indicated by the arrow. Pipe line 10 contains a control valve 11, the valve stem 12 of which extends horizontally and is coupled to a valve-actuating shaft 13, shaft 13 being rotatably carried in bearings 14 and 15 provided upon supports 16 and 17, respectively. Shaft 13 is held from longitudinal displacement by means of a head 18 provided on its end adjacent bearing 15, and a collar 19 fastened on its other end adjacent bearing 14.

A pair of oppositely extending swinging arms 20 and 21 are provided upon a hub fastened to shaft 13 at a point intermediate bearings 14 and 15, the arm 20 being a bucket-arm, and the arm 21 being a weight-arm. It will be seen that movement of arms 20 and 21 rotates shaft 13, which in turn operates valve 11 to control the flow of fluid through pipe line 10. The free end of bucket-arm 20 is hooked and supports the bail 22 of a bucket 23. The bucket is provided in its lower portion with a drain-cock 24. The bucket may also be provided with a hook 25 adapted to engage a link 26 on stake 27 for the purpose of holding the bucket down in its lowermost position, as will later be explained.

A pair of stop blocks 28 and 29 are mounted upon weight-arm 21 by means of bolts 30 passing through bolt holes 31. Arm 21 is provided with a plurality of such bolt holes 31 so that the stop blocks may be adjusted in position to meet varying conditions. Stop blocks 28 and 29 are provided with straight inclined portions 33 and 34 respectively, which, together with that portion of arm 21 between the inclines, provide a track for a trolley 35. Trolley 35 carries through its axis a weight-sling 36, the depending shanks 37 of which carry an adjustable weight 38. Frictional washers 39 of rubber or other suitable material may be provided upon the cross-part 40 of the sling adjacent the trolley faces 41, for the purpose of retarding the motion of the trolley and thereby precluding jarring of the apparatus as the trolley reaches its limiting stops.

A drip-pipe 50 having a drip-cock 51 leads from pipe line 10 at a point on the outlet side of valve 11, and discharges into bucket 23.

A check valve 54 is provided in the pipe line 10 at a point located near to and outside the connection of drip-pipe 50 with pipe line 10. This provision is made for the purpose of preventing fluid from backing up into the control apparatus when valve 11 is closed.

The motion of shaft 13 is preferably limited to a rotation of for instance approximately 45°, this being accomplished by means of a pin 55 provided in shaft 13 and adapted to move between a pair of stop shoulders 56 provided in bearing 15, as shown in Fig. 4. Arms 20 and 21 are then so positioned on shaft 13 as to swing through approximately 22½° on either side of a horizontal plane, valve 11 being one which may be operated by a rotation of 45° of its valve stem, the valve being closed when arm 20 is down and open when arm 20 is raised and arm 21 down, as indicated in the diagrams of Figs. 11 and 12.

The operation of the system is then as follows: Assuming bucket 23 to be empty, the downward moment on arm 21 is greater than that upon arm 20, and arm 20 is therefore up and arm 21 down, with trolley 35 resting on incline 34 and weight 38 suspended from the outer end of its arm 21. This is the position indicated in diagram in Fig. 11, and it will be seen that in this position valve 11 is open and fluid is permitted to flow through pipe line 10. Dripcock 51 is open sufficiently to allow a small proportion of the fluid in pipe 10 to be diverted through pipe 50 and drip into bucket 23. Drain-cock 24 is maintained slightly open so that fluid accumulated in the bucket can slowly escape. The rate of discharge of drain-cock 24 is made slower than that of drip-pipe 50 so that fluid may be accumulated in the bucket, the exact adjustment of these rates of discharge depending upon the operation desired, as will become apparent.

When sufficient fluid has been accumulated in the bucket, the moment on arm 20 overbalances that due to the weight 38 on arm 21, and the arms begin to tip. As arm 21 rises, incline 34 reaches a horizontal position before the arm itself does, and as soon as incline 34 passes the horizontal position, trolley 35 travels down the incline. The moment due to weight 38 is thus quickly reduced to a value substantially less than that of the counter-moment exerted upon the bucket-arm 20, and the bucket-arm therefore immediately descends and the weight-arm rises, trolley 35 traveling at once over the remainder of its track and coming to rest upon the incline 33, the system then being in the position shown in Fig. 1. The result of this movement of arms 20 and 21 is to rotate shaft 13 and thereby close valve 11, this position being indicated in the diagrammatic illustration of Fig. 12.

The discharge from drip-pipe 51 is now cut off from the source of supply by valve 11 and fluid is prevented from backing up from the pipe line beyond the control apparatus by virtue of check valve 54. The discharge into bucket 23 is therefore automatically cut off as the bucket reaches its lowermost position. The fluid accumulated in the bucket is now slowly discharged through drain-cock 24, and as long as sufficient fluid remains in bucket 23 to overbalance the moment due to weight 38 acting on arm 21 at stop block 28, the valve 11 is maintained in its closed position.

But when the quantity of fluid in the bucket has been sufficiently reduced due to discharge at 24. the weight-arm begins to tip downward, until the incline 33 of stop block 28 has passed through the horizontal position, when the trolley travels down the incline, thereby positively overbalancing the bucket and swinging the arms, and then proceeds at once down the remainder of its track and up against stop block 29, carrying weight 38 to the outer end of arm 21. The arms thus assume their original position, that indicated in Fig. 11, and the valve is again open, allowing the cycle to be repeated.

It is theoretically possible, under a certain setting of the variables of the system, that a point of equilibrium be reached at which the arms 20 and 21 become balanced in a horizontal position, and at that particular position of valve 11 the rate of discharge into bucket 23 be exactly equal to the rate of discharge from the bucket. This condition is prohibited by the provision of the straight-line inclines 33 and 34, which give the trolley a quick start and cause it to move a substantial distance along the track immediately that the arm 21 is slightly raised or lowered to pass the horizontal, as the case may be, and thus allow the moment of weight 38 to be quickly passed through the value at which equilibrium might occur. This condition of equilibrium is unlikely to occur even without the use of such inclines, and in certain cases of design and adjustment may never occur and the inclines may be omitted; but I have found that the operation of the system is made positive and certain by their use, and therefore prefer their inclusion.

It will be seen that the variables of the system comprise the drain-cock 24, the dripcock 51, and the weight 38 and the position of stop blocks 28 and 29 upon arm 21. The length of the period during which the control valve is to remain closed may be regulated either by means of drain-cock 24 or by varying the constants of the weight-arm 21 (the weight 38 itself, or the position of the stop blocks). The length of the period during which the control valve is to remain open and flow be allowed to take place may be regulated by means of the drip-cock 51, or by varying the constants of the weight-arm, mentioned above. It will be apparent that by varying the constants of this weight-arm in either case changes both the period of rest and of flow. Therefore, having fixed the size of the apparatus and determined the other variables it is preferable, though not necessary, to do most of the regulating by means of drain-cock 24 and drip-cock 51, which control entirely independently the respective periods of flow and rest. Thus not only can both the periods of flow and of rest be adjusted, but each can be adjusted entirely independently of the other.

If, for any reason, it is desired to interrupt the operation of the system and maintain valve 11 closed the bucket-arm 20 may be maintained in its down position by means of hook 25 and link 26.

In Fig. 6 I show a means of dissipating the fluid accumulated in the bucket by virtue of evaporation instead of by discharge. The bucket 23b there shown is provided with a slidably mounted cover 60 having an end plate 61. Evaporation will be seen to be mainly restricted to the unenclosed portion of the accumulated fluid, and the rate of evaporation may be regulated by adjusting the position of the cover, as will be apparent. This modification has especial utility when long periods of rest are required.

In Figs. 7, 8 and 9 I show a present embodiment of my invention, which incorporates certain features in addition to those shown in the embodiment of Fig. 1.

The pipe line is illustrated at 10a, the control valve at 11a, and the check valve at 54a, the direction of flow being indicated by the arrow. Pipe line 10a is supported by means of a pair of pipe lengths 65 screwed into T-couplings provided in the pipe line, plugs 66 being provided to close the upper end of pipes 65. A valve actuating pipe length 13a is operatively connected at one end to the stem of valve 11a, and is supported at its other end in a bearing 68 carried by a horizontal pipe length 69 supported by upright lengths 70.

Pipe length 13a is provided with a pair of weight-arms 21a, and with an oppositely extending bucket-arm 20a. The arms 21a, which may be formed of round rods, are bent to provide inclines 33a and 34a, similar to the inclines provided by the stop blocks of the other embodiment. Stop collars 28a and 29a are provided on the weight-arms at the upper ends of the inclines, as shown. Running on arms 21a between the stop collars are trolleys 35a, which may be provided by ordinary pulleys 72, and from which are suspended the weights 37a. The bucket-arm 20a is hooked and carries a bucket 23a having a drain-cock outlet 24a, as before.

The drip-pipe 50a leads from pipe line 10a at a point between valves 11a and 54a and contains a drip-cock 51a, pipe 50a discharging into a bucket 23a, as before. It also contains a stop-cock 80 actuated by a lever 81, the free end 82 of which is bifurcated to take the swinging end of bucket-arm 20a, as may be clearly seen from Figs. 7 and 10. When the bucket-arm 20a moves down, it carries lever 81 with it, closing stop-cock 80 and positively preventing any leakage from either valve to be discharged into the bucket. When the bucket-arm rises, lever 81 is raised and stop-cock 80 is accordingly opened.

In Figs. 8 and 9 I show the apparatus surrounded by an enclosure 90 having an inclined cover or roof 91 adapted to catch rainfall. The lowest point of the roof is located directly over the bucket 23a, and is provided with a discharge opening 92 through which the collected rainfall is discharged into the bucket. If the cover is of proper extent, it will be apparent that in times of rainfall the bucket will receive sufficient water from this source to maintain bucket arm 20a in its down position and valve 11 closed. The system is thus rendered entirely automatic for dry or rainy weather. In dry weather, for instance, the system operates under the exclusive control of the drip-pipe and bucket discharge, the control valve being maintained alternately open and closed in accordance with the predetermined periods of flow and rest. During times of rainfall, however, the control-valve is maintained closed under the superior control of the rain collecting cover 91, which discharges sufficient water into the bucket to maintain it in its lowermost or closed-valve position. When the rainy condition has passed, the bucket can again empty and normal operation is resumed.

In Fig. 13 I show a variational embodiment of the apparatus, generally similar to the form shown in Fig. 1, but provided with certain modifications as hereinafter set out. The pipe line is here indicated at 10c, the swinging arms at 20c and 21c, and the upright supports at 16c. The bucket 23c is supported by bail 22c from the hooked end of arm 20c, and is pivotally supported at its rear edge, as at 90, by a horizontal cross member 91 provided between supports 16c. The bucket is adapted to swing between the upper full line position and the lower dotted line position of the figures, and to hold fluid in either position. A drain cock 24c is provided in the side of the bucket, and is arranged to be above the water level L when the bucket is in its upper or full line position, and to be below the water level L' when the bucket is swung to its lower or dotted line position. Thus discharge from the bucket can take place only when the bucket is in its lower position, at which time the drain-cock is below the water level. The drip cock 51c is located over the bucket in such a manner as to discharge just within its rear edge 93 when the bucket is in the upper or full line position, but to discharge outside the rear edge when the bucket is in its lower or dotted line position. The consequence of this arrangement is that discharge from the drip-cock can fall into the bucket only when the bucket is in its upper position, and is cut off as the bucket tips downward, thus preventing leakage discharge into the bucket during the period of discharge from the bucket. The advantages of arranging the bucket in this manner are that during the period of accumulation in the bucket discharge from the bucket is positively cut off, and during the period of discharge from the bucket accumulation in the bucket is positively cut off.

It will now be seen, considering the invention broadly, that I have provided a quantity control apparatus adapted to control positively the periods of flow and rest of fluid in a conduit, and in which the duration of either of said periods may be independently adjusted.

It will be understood that the drawings and description are to be considered merely as illustrative and not restrictive on the broader claims appended hereto, for various changes in design, structure and arrangement may be made without departing from the spirit and scope of said claims.

I claim:

1. In combination with a pipe line having a control valve, said control valve having a valve stem and being operated by rotation thereof, a valve actuating shaft operatively connected to the valve stem, a swinging bucket-arm mounted upon said shaft, a bucket suspended from the free end of said bucket-arm, a supporting member pivotally supporting one edge of said bucket, a discharge opening at the opposite edge of said bucket, a drip-pipe leading from the pipe line and adapted to discharge into the bucket, a swinging weight-arm mounted upon the shaft and extending oppositely to the bucket-arm, and a weight carried by said weight-arm and limitedly movable thereon.

2. In combination with a pipe line having a control valve, said control valve having a valve stem and being operated by rotation thereof, a valve actuating shaft operatively connected to the valve stem, a swinging bucket-arm mounted upon said shaft, a bucket suspended from the free end of said bucket-arm, a supporting member pivotally supporting one edge of said bucket, means for dissipating fluid from the bucket when the bucket is in its lowermost position, a drip-pipe leading from the pipe line and arranged to discharge inside the pivoted edge of the bucket when the bucket is in its uppermost position, and to discharge outside the pivoted edge of the bucket when the bucket is in its lowermost position, a swinging weight-arm mounted upon the said shaft and extending oppositely to the said bucket-arm, and a weight carried by said weight-arm and limitedly movable thereon.

3. In combination with a pipe line having a control valve: a rotatably mounted shaft connected to operate said valve between open and closed positions by rotation through a given angle; a swinging bucket-arm mounted on and extending from said shaft; a bucket carried by said bucket-arm; means for gradually accumulating in said bucket liquid diverted from flow through said pipe line; means for dissipating liquid accumulated in said bucket; a swinging weight-arm mounted on and extending from the shaft oppositely to the bucket-arm and arranged to swing through substantially equal angles on either side of horizontal as the shaft rotates through the valve operating angle, the relation between the weight-arm and the valve being such that the valve is open when the weight-arm is in its below-horizontal position and closed when the weight-arm is in its above-horizontal position; a weight-stop at each end of a track portion provided on said weight arm, said track portion having straight-line inclines sloping downwardly on the arm from said stops, the straight-line incline associated with the outer stop sloping below horizontal toward said outer stop when the arm is swung to the lower limit of its normal movement, and the straight-line incline associated with the inner stop sloping below horizontal toward said inner stop when the arm is swung to the upper limit of its normal movement; and a weight adapted to run on said track portion of said weight-arm.

In witness that I claim the foregoing I have hereunto subscribed my name this 10th day of September, 1928.

PATRICK DE LACY-MULHALL.